April 29, 1958  J. O. HELVERN  2,832,444
BRAKE BOOSTER
Filed Nov. 9, 1954  3 Sheets-Sheet 3

INVENTOR.
JAMES O. HELVERN
BY Craig V. Morton
HIS ATTORNEY

United States Patent Office 2,832,444
Patented Apr. 29, 1958

2,832,444

BRAKE BOOSTER

James O. Helvern, Lewisburg, Ohio, assignor to General Motors Corporation, Detroit, Mich., a corporation of Delaware Application November 9, 1954, Serial No. 467,724

5 Claims. (Cl. 188—141)

This invention relates to apparatus for power application of brakes of motor vehicles.

Conventionally, power units are provided on motor vehicles by which a power aid is provided to reduce the effort of braking. Power units that are in common current usage in passenger vehicles are of a pressure differential type adapted to be connected to a vacuum source whereby to effect a pressure differential in the power unit and thereby effect actuation of the unit. Normally the power unit is connected with the manifold of the engine of the vehicle to obtain the desired source of vacuum for actuation of the power unit.

At times when the engine is not operating, the source of vacuum is not available and some auxiliary source of vacuum is required to be made available for power operation of the power unit. This has been taken care of by way of auxiliary vacuum storage tanks or electrically operated vacuum pumps that become operative when the vehicle engine is inoperative.

It is an object of this invention to provide a power unit for operating the brakes of a hydraulic brake system of a motor vehicle that is independent of the operation of the engine of the vehicle and eliminates the necessity for auxiliary pressure or vacuum sources by operatively connecting the power unit with the wheels of the motor vehicle, or a power shaft driven thereby, so that the power unit will be available for operation at any time the wheels of the vehicle are in motion.

It is another object of the invention to provide a power unit for operating the hydraulic brakes of a hydraulic brake system wherein a power shaft is rotated in response to rotation of the wheels of the vehicle on which the unit is mounted to provide an available power source whenever the vehicle is in motion that can be transmitted through a friction drive device to the fluid displacement device or master cylinder of the hydraulic brake system to power actuate the master cylinder from the power driven shaft.

It is another object of the invention to provide apparatus in accordance with the foregoing object wherein the friction drive mechanism is rendered operative manually in response to operation of the brake pedal of a motor vehicle on which the apparatus is mounted.

It is still another object of the invention to provide a mechanical leverage proportioning system by which the reaction of the braking effort is proportioned to the power effort applied to effect a proportioned brake feel to the brake pedal of the motor vehicle.

Further objects and advantages of the present invention will be apparent from the following description, reference being had to the accompanying drawings wherein a preferred form of the invention is clearly shown.

Figure 1:
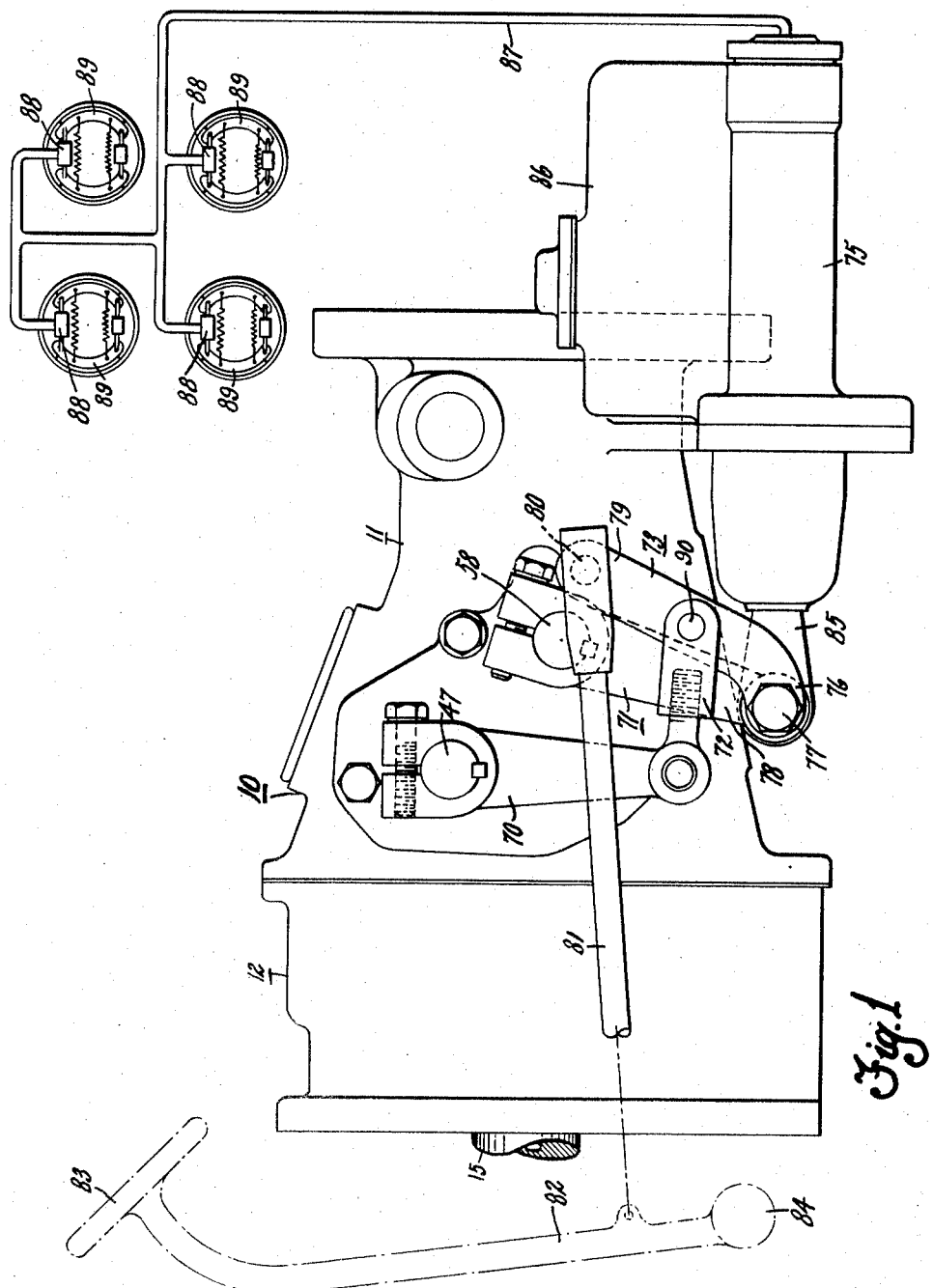
Figure 1 is an elevational view of a power unit incorporating features of this invention in diagrammatic association with the hydraulic brake system for a motor vehicle.

In this invention the power unit 10 comprises a casing 11 that is supported upon a housing member 12 that in turn is carried upon the housing 13 of the transmission of a motor vehicle. A rotatable shaft 15 is journaled within the transverse wall 16 of the casing 11 and is also journaled in the transverse wall 17 of the housing 12.

The rotatable shaft 15 forms a part of the drive shaft or propeller shaft of a motor vehicle, the left hand end of the shaft 15 being suitably connected to a speed change transmission 20 that in turn is suitably connected to the engine 21 of a motor vehicle. The right hand end of the rotatable shaft 15 is suitably connected to the propeller shaft or drive shaft of a motor vehicle which in turn is connected with the conventional differential 22 through which the wheels of the vehicle are driven.

A friction drive means 25 comprises a plurality of drive plates 26 supported upon a drive ring 27 that is splined upon the shaft 15 by the splined connection 28. Snap rings 29 retain the drive ring 27 axially in position on the shaft 15. The drive plates 26 are supported on the drive ring 27 by a splined connection 30 to allow for axial movement of the plates 26 on the drive ring 27.

The friction drive means also includes a housing 35 that supports a plurality of driven plates 36. The plates 36 are prevented from rotation within the housing 35 by the splined connection 37. The housing 35 is rotatably supported in the housing 12 by the anti-friction bearing 38.

The friction drive device 25 also includes an actuating plate 40 that is prevented from rotation relative to the housing 35 by the splined connection 37. A snap ring 41 retains the actuating plate 40 within the annular wall 42 of the housing 35. The housing 40 is supported upon the shaft 15 by an anti-friction roller or needle bearing 54 whereby to provide for relative rotation between the shaft 15 and the friction drive device 25.

The actuating plate 40 of the friction drive device is provided with a radially positioned flat face 43 adapted to be engaged by the rollers 44 provided at each end of a yoke lever 45. Opposite ends of the yoke lever 45 are pivotally mounted in the housing 11 by means of the bearing extensions 46 and 47, the yoke lever 45 being disposed pivotally and rotationally transversely of the axis of the actuating plate 40 and of the power shaft 15. The bearing extensions 46 and 47 of the yoke lever 45 are disposed above the axis of the rollers 44 so that rotation of the lever 45 on its pivot bearings 46 and 47 will effect oscillation of the rollers 44 about the axis of rotation of the lever 45, and thus effect axial movement of the actuating plate 40 of the friction drive device 25.

The rollers 44 are each carried upon a stud 48 in the respective depending arms 49 of the yoke lever 45.

The rollers 44 engage the radial flat face 43 of the actuating plate 40 to effect reciprocal movement of the plate.

Figure 4:
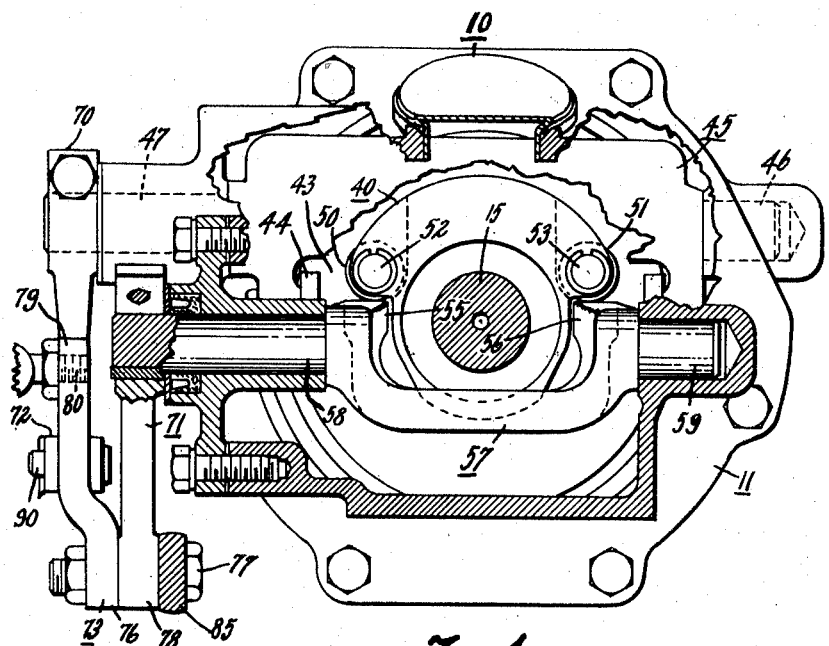
Figure 4 is a transverse cross sectional view taken along line 4—4 of Figure 2.

The actuating plate 40 is provided with a pair of rollers 50 and 51 on opposite sides of its axis, as shown in Figure 4, the rollers being supported on studs 52 and 53.

The rollers 50 and 51 are adapted to engage respectively the ends of the arms 55 and 56 that project upwardly from the yoke lever 57 that has the bearing extensions 58 and 59 that support it transversely of the axis of the rotatable shaft 15. Rotation of the actuating plate 40 in either direction on its axis, which is the axis of the shaft 15, will effect downward movement of the arms 55 and 56 of the lever 57 and thus rotation of the bearing extensions 58 and 59 on their axes. The driving plates 26 of the friction drive device 25 are adapted to slide relative to the driven plates 36 after a predetermined rotational force is applied to the actuating plate 40 of the friction drive device, the rotational force applied to the plate 40 being such as to effect the desired brake actuation in a manner hereinafter described.

Heat developed by frictional movement between the plates 26 and 36 of the friction drive device 25 is removed by circulating the cooling fluid between the plates. The cooling fluid is circulated by means of a gear pump 60 of any suitable character. The gear pump 60 picks up liquid from the reservoir 61 of the transmission housing 13 through the suction line 62 and delivers the fluid under pressure into the annular chamber 63 from whence the fluid flows through the port 64 into the chamber 65 and thence between the plates 26 and 36. Excess fluid returns to the reservoir through the drain passage 66.

The lever 45 is adapted for manual actuation by means of the brake pedal of the motor vehicle, the bearing extension 47 supporting a lever 70 that is connected in a manner hereinafter described with the brake pedal for rotation of the lever on the axis of the bearing extensions 46 and 47.

The lever 57 has its bearing extension 58 connected with a lever 71 to effect oscillation of the lever 71 upon rotation of the lever 57 upon its pivot axis formed by the bearing extensions 58 and 59. The oscillatable lever 71 is connected with the master cylinder 75 of the hydraulic brake system in a manner hereinafter described to reciprocate the piston in the master cylinder 75 and thereby deliver fluid under pressure into the hydraulic brake system of the motor vehicle. The lever 70 that is manually operated by the brake pedal of the vehicle is connected by means of a clevis connection 72 with a link 73 that has one end 76 thereof connected to a stud 77 that also supports the lower end 78 of the lever 71. The upper end 79 of the link 73 is connected by a pin 80 with an actuating rod 81 that in turn is connected to the arm 82 extending from a brake pedal 83 of a motor vehicle. The arm 82 is pivoted about a pivot connection 84. The piston within the master cylinder 75 has an extending end 85 that is connected with the stud 77. The stud 77 thus interconnects the lower ends of the lever 71 and the link 73 with the piston extension 85 of the master cylinder 75.

The leverage connection between the actuating rod 81 and the master cylinder 75 through means of the link 73 provides for a proportioning of the brake reaction effected through the master cylinder to give a brake feel to the pedal 83.

The master cylinder 75 carries a reservoir chamber 86 that supplies make up fluid to the master cylinder in any conventional manner. The master cylinder 75 discharges fluid under pressure into a brake line 87 that in turn supplies the high pressure fluid to the operating wheel cylinders 88 of the hydraulically actuated brakes 89.

Whenever the motor vehicle is in motion, the shaft 15 will be rotated either as a result of being driven by the engine and thus driving the vehicle, or as a result of being driven by the rear wheels of the vehicle through the differential whenever the engine is idle and the vehicle is in motion for any cause. Thus, the shaft 15 will always be rotated and is a source of power available for use at any time the vehicle is in motion. Also, the driving plates 26 will be rotated with the shaft 15 to make available power for rotating the housing 35 and actuating plate 40 of the friction drive device whenever the actuating plate 40 effects engagement of the driven and driving plates of the friction drive device 25.

To effect engagement of the driving and driven plates of the friction drive device 25, the operator of the vehicle depresses the brake pedal 83 about its pivot 84 to move the actuating rod 81 in a left hand direction as viewed in Figure 1. This motion causes rotation of the link 73 about the stud 77 as a pivot, the hydraulic fluid in the master cylinder 75 tending to retain the piston of the master cylinder stationary so that at this time the stud 77 can act as a pivot for the link 73 in a counter-clockwise rotation about the stud 77.

The counter-clockwise rotation of the link 73 about the stud 77 effects clockwise rotation of the arm 70 and thus clockwise rotation of the shaft end 47 which in turn effects clockwise rotation of the yoke lever 45 to urge the rollers 44 against the face 43 of the actuating plate 40 to effect friction engagement between the driving and driven plates of the friction drive device 25.

Figure 2:
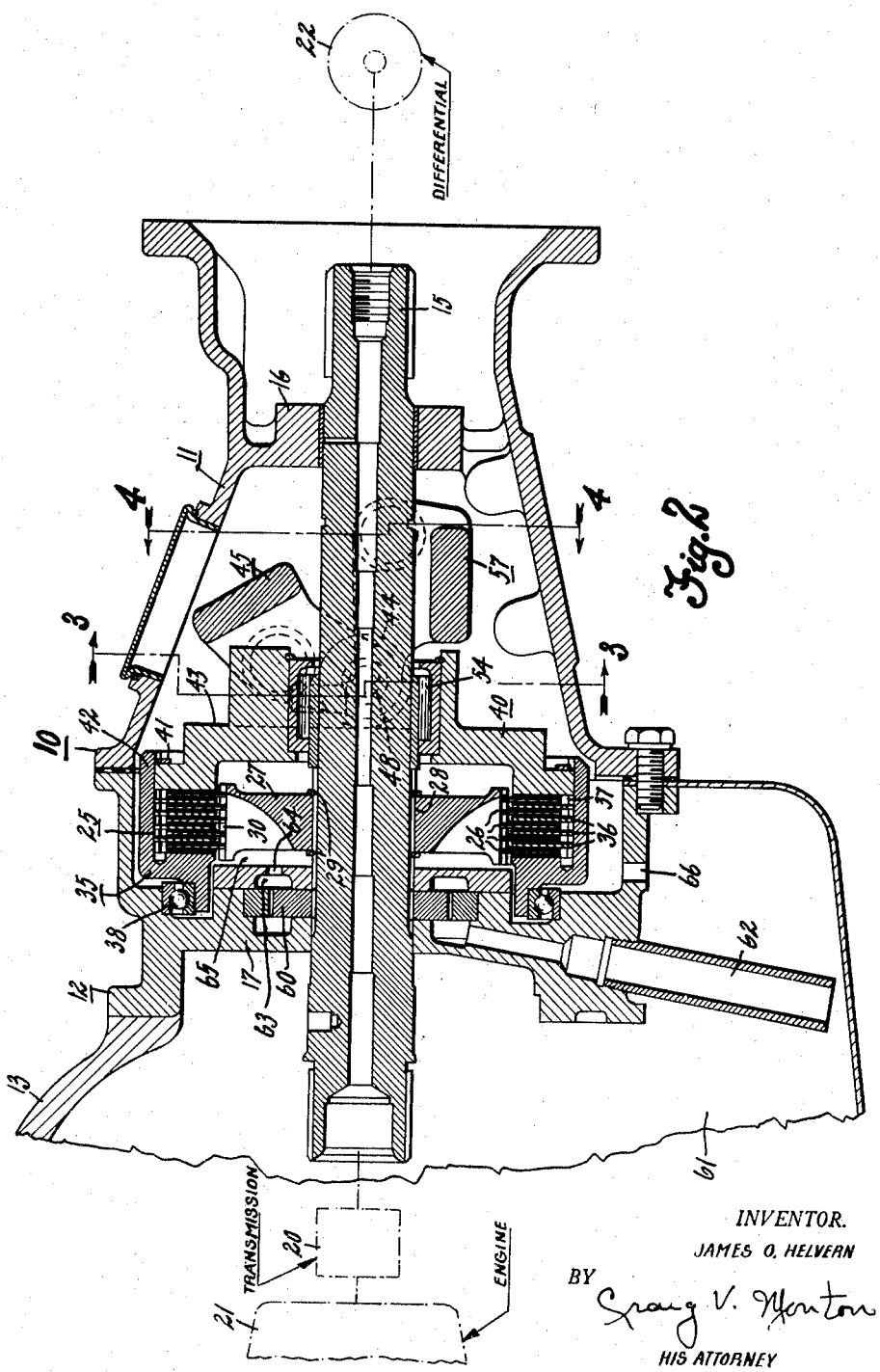
Figure 2 is a longitudinal vertical cross section of the power unit of this invention.
Figure 3:
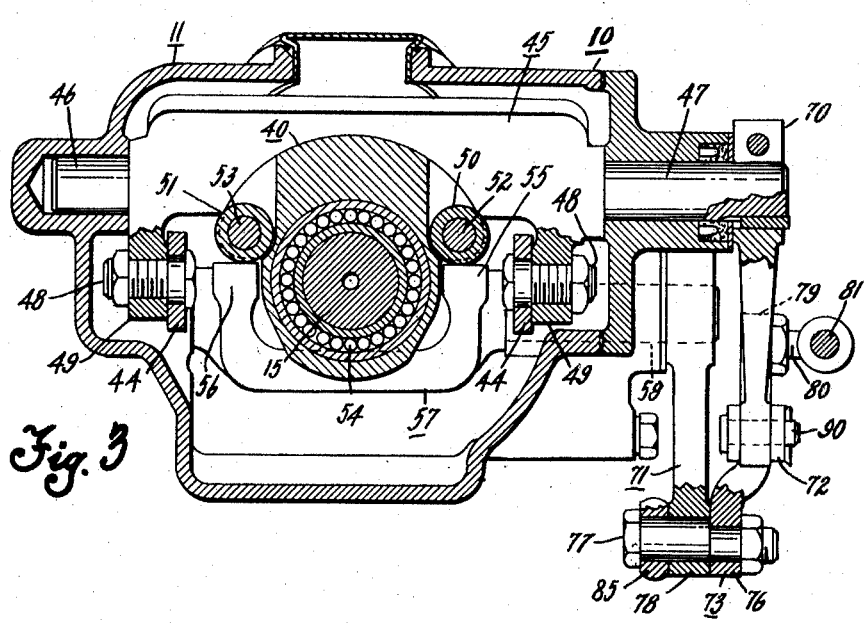
Figure 3 is a transverse cross sectional view taken along line 3—3 of Figure 2.

Engagement of the friction drive device 25 effects rotation of the housing 25 and the actuating plate 40 about the axis of the shaft 15. This rotation of the actuating plate 40 causes one or the other of the rollers 50 and 51, depending upon the direction of rotation of the plate 40 to engage one or the other of the arms 55 and 56 and depress the arms downwardly, as viewed in Figures 2 and 4. This depressing of the arms 55 or 56 effects a counter-clockwise rotation of the yoke lever 57 about the axis of its bearing extensions 58 and 59. This counter-clockwise rotation of the shaft 58 extending from lever 57 effects counter-clockwise rotation of the arm 71 and thus moves the extension 85 on the master cylinder piston in a right hand direction as viewed in Figure 1 to displace fluid under pressure from the master cylinder 75 into the brake line 87 for actuation of the brakes 89.

It will be apparent that with the arm 70 connected with the link 73 through the clevis 72 by the pin 90 intermediate opposite ends of the link 73 that the manual effort of applying the brakes through the rod 81 and the power effort of applying the brakes through the arm 71 will be proportioned as will the reaction effort of applying the brakes.

The frictional driving effort between the driving plates 26 and the driven plates 36 of the friction drive device will be proportioned to the braking effort desired with the driving plates 26 in sliding frictional engagement with the driven plates 36 and just sufficient effort being applied between the two plates to effect the desired brake effort through the mechanical linkage into the master cylinder 75.

While the form of embodiment of the invention as herein disclosed constitutes a preferred form, it is to be understood that other forms might be adopted as may come within the scope of the claims which follow.

What is claimed is as follows:

1. A power unit adapted for operation of hydraulically operated vehicle brakes, comprising, hydraulic fluid displacement means adapted for providing fluid under pressure to the hydraulic brake system of a motor vehicle, a rotatable power shaft, friction drive means having first driving plate means carried on said shaft and rotated thereby and second driven plate means with respect to which said shaft is freely rotatable, said driven plate means also comprising an actuating plate means to provide for axial movement of the said plate means relatively to effect friction engagement for rotation of the driven plate means and said actuating plate means from the driving plate means, a first oscillatable lever means journaled transversely of the axis of said actuating plate means and having arm means oscillatable normal to said actuating plate means and engaging the driven actuating plate means to effect axial movement of the said plate means upon oscillation of the lever means to effect engagement of the driven and driving plates for rotation of the said actuating plate means, a second oscillatable lever means journaled transversely of the axis of said actuating plate means and having arm means projecting toward said plate means engaged by protrusion means on said driven actuating plate means to effect oscillation of said second lever means by rotation of said actuating plate means, and connecting means connecting said last mentioned lever means with said fluid displacement means to effect actuation thereof thereby.

2. A power unit in accordance with claim 1 in which a protrusion on said driven actuating plate means extends from the plate means on opposite sides of its axis to engage said second lever means selectively depending on the direction of rotation of the said plate means to actuate said second lever means in either direction of rotation of the plate means.

3. A power unit adapted for operation of hydraulically operated vehicle brakes, comprising, hydraulic fluid displacement means adapted for providing fluid under pressure to the hydraulic brake system to a motor vehicle, a rotatable power shaft, friction drive means having first driving plate means carried on said shaft and rotated thereby and second driven plate means with respect to which said shaft is freely rotatable, said driven plate means also comprising actuating plate means to provide for axial movement of the said plate means relatively to effect friction engagement for rotation of the driven plate means and said actuating plate means from the driving plate means, a first oscillatable lever means rotatably mounted transversely of the axis of said plate means and having arm means engaging said plate means oscillatable normal to said plate means to effect axial movement thereof upon oscillation of the lever means on its axis to effect engagement of the driven and driving plates for rotation of said actuating plate, a second oscillatable lever means rotatably mounted transversely of the axis of said actuating plate and parallel to said first lever means and having arm means projecting toward said plate means engaging protrusion means on said actuating plate whereby to effect oscillation of said second lever means on its axis by rotation of said actuating plate, and connecting means connecting said last mensioned lever means with said fluid displacement means to effect power actuation thereof thereby.

4. A power unit adapted for operation of hydraulically operated vehicle brakes, comprising, hydraulic fluid displacement means adapted for providing fluid under pressure to the hydraulic brake system of a motor vehicle, a rotatable power shaft, friction drive means having first driving plate means carried on said shaft and rotated thereby and second driven plate means with respect to which said shaft is freely rotatable, said driven plate means also comprising actuating plate means to provide for axial movement of the said plate means relatively to effect friction engagement for rotation of the driven plate means and said actuating plate means from the driving plate means, a first oscillatable lever means rotatably mounted transversely of the axis of said plate means and having a depending portion engaging said plate means imparted with a generally reciprocal movement normal to said plate means on oscillation of said lever means to effect axial movement of the said plate means upon oscillation of the lever means on its axis to effect engagement of the driven and driving plate for rotation of the said actuating plate, a second oscillatable lever means rotatably mounted on the axis of said actuating plate means parallel to said first lever means and having a generally radial extension engaged by protrusion means on the said actuating plate means to effect oscillation of the said second lever means by rotation of the said plate means, and connecting means connecting said last mentioned lever means with said fluid displacement means to effect actuation thereof thereby.

5. A power unit adapted for operation of hydraulically operated vehicle brakes, comprising, hydraulic fluid displacement means adapted for providing fluid under pressure to the hydraulic brake system of a motor vehicle, a rotatable power shaft, friction drive means having first driving plate means carried on said shaft and rotated thereby and second driven plate means with respect to which said shaft is freely rotatable, said driven plate means also comprising an actuating plate means to provide for axial movement of the said plate means relatively to effect friction engagement for rotation of the driven plate means from the driving plate means, a first oscillatable lever means engaging said driven actuating plate means to effect axial movement of the driven plate means upon oscillation of the lever means to effect engagement of the driven and driving plates for rotation of said actuating plate means, a second oscillatable lever means engaged by said actuating plate means to effect oscillation of said second lever means by rotation of said actuating plate means, said second lever means being supported on shaft means effected with rotation by oscillation of said second lever means, said shaft means supporting a link oscillatable with said shaft means, said link having a free end connecting with said fluid displacement means to effect actuation thereof by reciprocation of the free end of said link, said free end of said link supporting a second link disposed substantially parallel to the first link, said second link having its free end attached to an actuating arm for manual operation thereby, said second link also having a connection positioned between its opposite ends with a pivot axis shaft on which said first oscillatable lever means is supported whereby said second link is moved in response to oscillations of said first lever means.

References Cited in the file of this patent
UNITED STATES PATENTS
2,206,976 Rossman _____ July 9, 1940